March 11, 1947.   O. KYLIN ET AL   2,417,366
POWER INDEXING MECHANISM
Filed June 30, 1942   5 Sheets-Sheet 1

OSKAR KYLIN
HENRIK O. KYLIN   INVENTORS
MICHAEL L. VALENTINO
BY

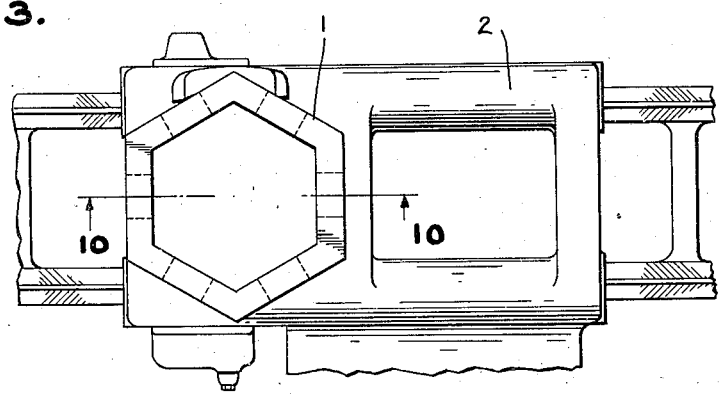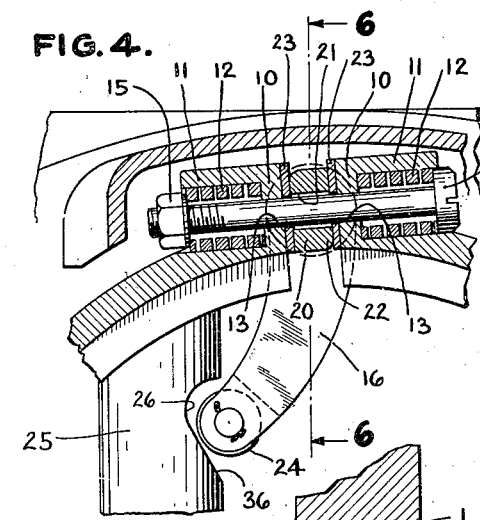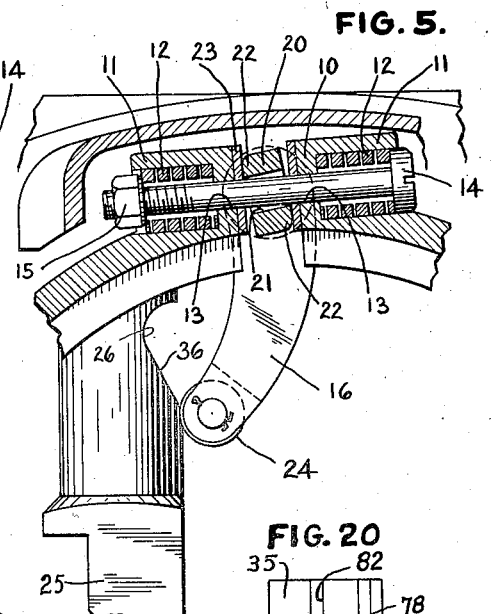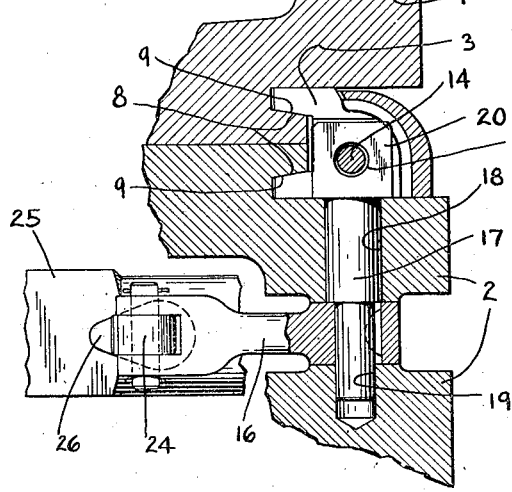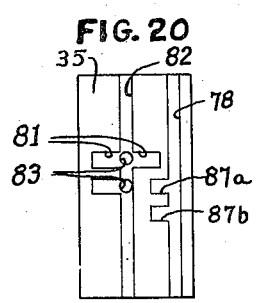
OSKAR KYLIN
HENRIK O. KYLIN INVENTORS
MICHAEL L. VALENTINO March 11, 1947.   O. KYLIN ET AL   2,417,366
POWER INDEXING MECHANISM
Filed June 30, 1942   5 Sheets-Sheet 3

OSKAR KYLIN
HENRIK O. KYLIN  INVENTORS
MICHAEL L. VALENTINO
BY
*Hawgood & Van Horn,*
*Their Attorneys*

March 11, 1947. O. KYLIN ET AL 2,417,366
POWER INDEXING MECHANISM
Filed June 30, 1942 5 Sheets-Sheet 4

OSCAR KYLIN INVENTORS
HENRIK O. KYLIN
MICHAEL L. VALENTINO
BY
*Haywood & Van Horn,*
Their Attorneys March 11, 1947. O. KYLIN ET AL 2,417,366
POWER INDEXING MECHANISM
Filed June 30, 1942 5 Sheets-Sheet 5
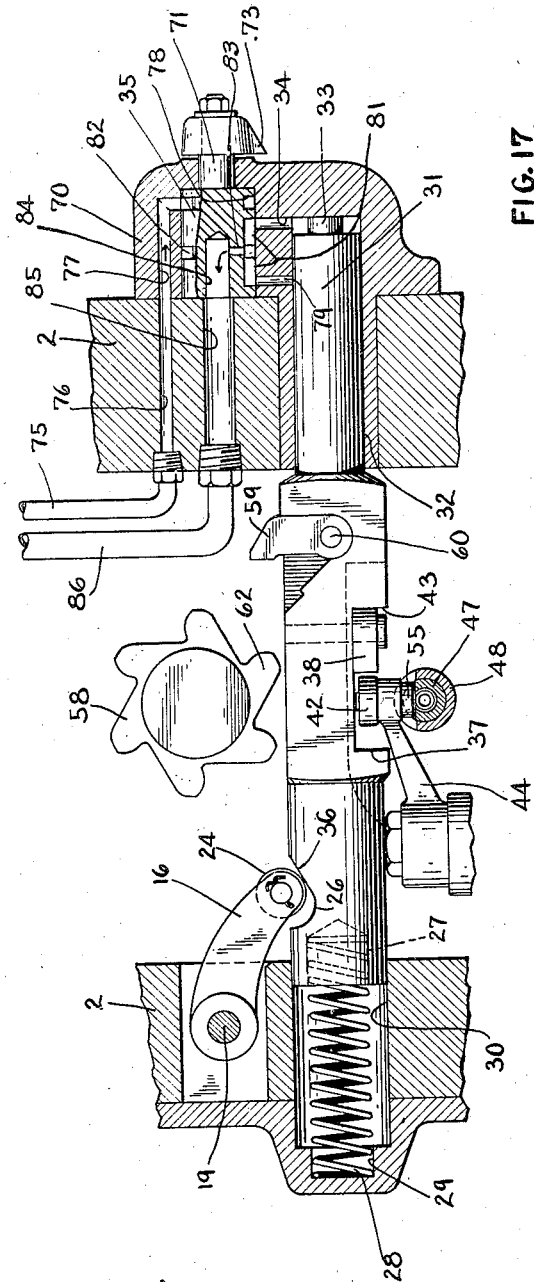
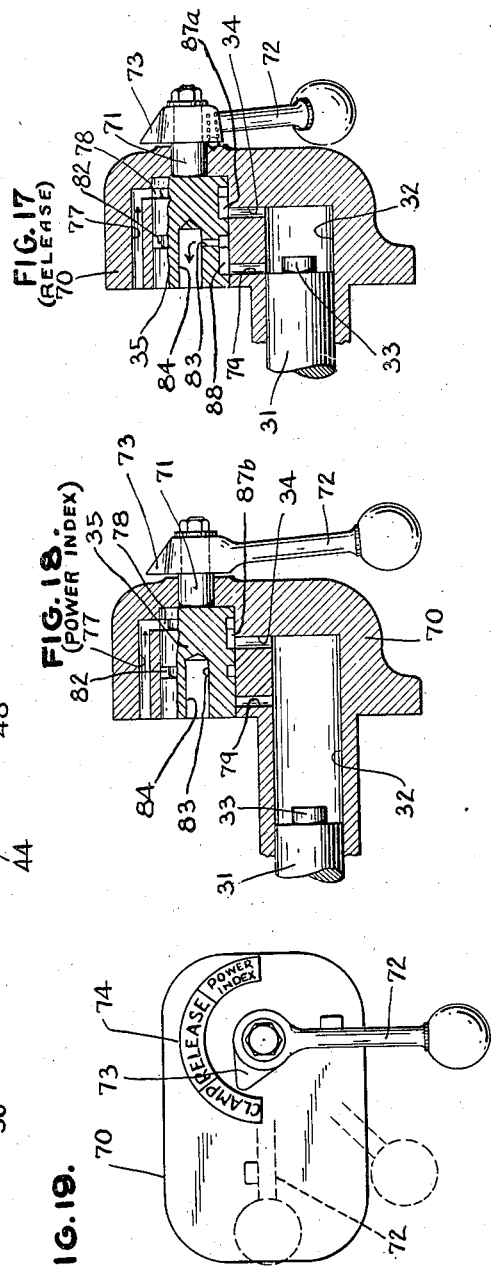
OSKAR KYLIN
HENRIK O. KYLIN INVENTORS
MICHAEL L. VALENTINO
BY
*Their Attorneys*

Patented Mar. 11, 1947

2,417,366

UNITED STATES PATENT OFFICE 2,417,366

POWER INDEXING MECHANISM

Oskar Kylin, Henrik O. Kylin, and Michael L. Valentino, Cleveland Heights, Ohio, assignors to Bardons and Oliver, Inc., Cleveland, Ohio, a corporation of Ohio Application June 30, 1942, Serial No. 449,068

2 Claims. (Cl. 29—49)

Our invention is an improvement in machine tools and relates more particularly to a power operated indexing mechanism for locating a multifaced turret or tool holder with respect to the work piece and for locking the same in its indexed position.

One of the objects of the invention is to provide an indexing mechanism of the above named character which is also capable of manual operation.

Another object of the invention is the provision of hydraulically operated means for indexing a turret or the like, locking the indexed turret during a tool operation on the work and subsequently unlocking the turret preparatory to a further indexing thereof.

A further object is to control a turret during a plurality of successive tool operations on a work piece, by providing power operated means for selectively unclamping, unlocking, indexing, locating, locking and/or clamping the turret on its saddle or support.

Another object consists in providing a mechanism of the kind referred to which is positive in operation, relatively simple of construction and which may be easily operated by means of a single selective control means to perform any or all of the functions herein described.

A still further object of the invention is a turret indexing mechanism hydraulically operable through a single selective control valve.

Another object of the present invention is the provision of means for power indexing a turret together with power operated means for locking the same on its base against rotative movement between indexing operations and to unlock the same to permit a subsequent manual or power operated indexing operation in either direction of rotation and to any station or face of the turret.

Other objects and advantages of the invention will become more apparent as the following description of an embodiment thereof progresses, reference being made to the accompanying drawings, in which like reference characters are employed to designate like parts throughout the same.

In the drawings—

Figure 3 is a plan view of the turret and slide;

Figure 4 is a fragmentary section slightly enlarged and taken on line 4—4 of Figure 2 and showing the turret clamped;

Figure 5 is a fragmentary section similar to that in Figure 4, but shows the relative positions of the parts when the turret is unclamped;

Figure 6 is a vertical section taken on line 6—6 of Figure 4;

Figure 16 is a sectional view through the turret support and control valve and in elevation illustrates the position of the slide bar with respect to the indexing ratchet wheel and the locating and locking mechanism. In this position the turret is clamped and locked on its saddle;

Figures 17 and 18 are sectional views through the fluid control valve and respectively show the valve in "Release" position and in "Power Index" position;

Figure 19 is a front elevation of the control valve handle and position indicator; and Figure 20 is a development of the control valve.

Figure 1:
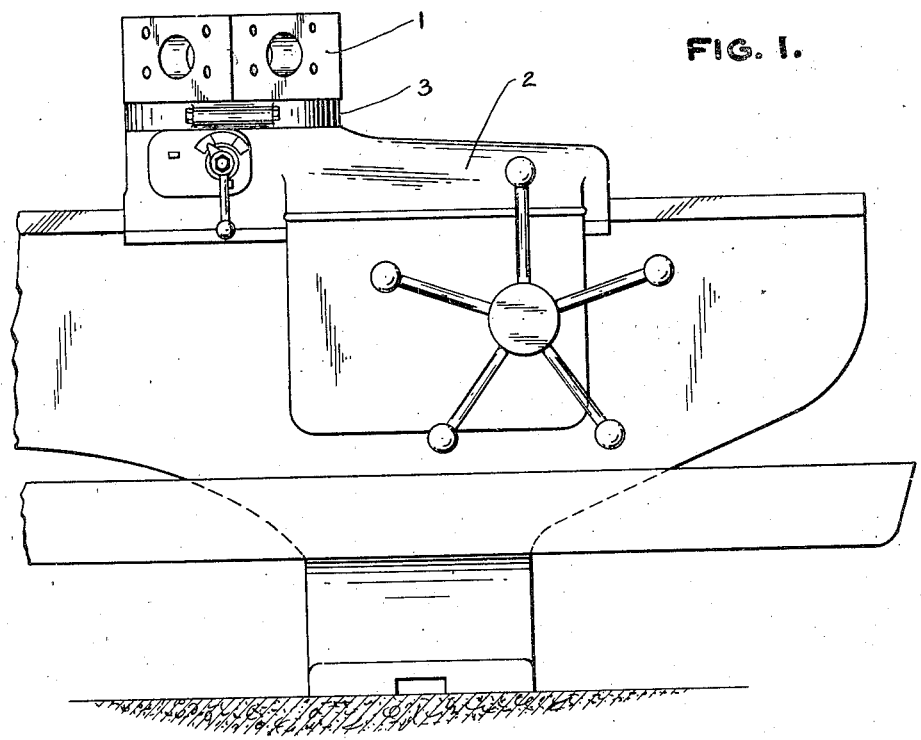
Figure 1 is a front elevation of a machine tool, such as a turret lathe, showing the invention applied in use.
Figure 2:
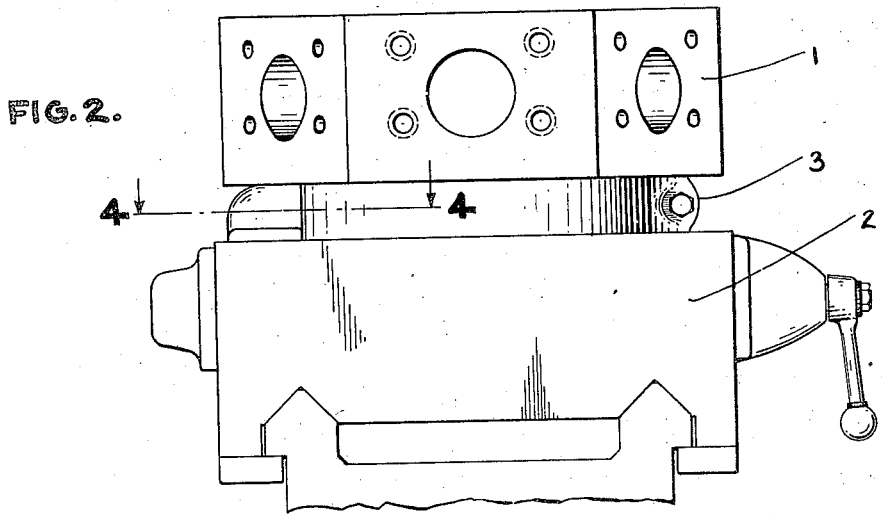
Figure 2 is an end elevation of the same.

Referring now more particularly to the several figures of the drawings, a tool turret 1 is rotatably mounted on a suitable support 2 and is adapted to be clamped to the support in any of its rotative positions by means of a clamping ring 3.

The present invention includes power operated means for clamping and unclamping the turret on its saddle or support 2 in a selected rotative position, together with a turret locating and locking mechanism, all of which may be actuated by a single control means located for convenient manipulation by the operator.

In the present embodiment of the invention we have shown hydraulically operated means for clamping, unclamping and unlocking the turret, and for indexing, locating and locking the turret in a selected position on its saddle, but is to be understood that in accordance with our invention the same may be operated mechanically, magnetically or electrically if desired.

The turret 1 is rotatably carried on the saddle 2 by means of the projecting portion 4 and the bearing 5. The turret base and the support are grooved peripherally to provide flanges 6 and 7, respectively, the surfaces 8 of the flanges converging outwardly and adapted to be engaged by similarly inclined internal walls 9 of the channelled clamping ring 3, so that when the ring, which is separated laterally at one point, is contracted, the surfaces 9 will slide radially upon the walls 8 tending to clamp the turret in place. When the ring is expanded or loosened the binding action of the walls 8 and 9 is released and the turret is unclamped and capable of free rotation in either direction.

As illustrated in Figures 4 and 5, the ends of the ring, defining the separation circumferentially, terminate in lugs 10 each having portions 11 extending rearwardly of the separation to house the compression springs 12. Each of the lugs 10 is provided with aligned openings 13 through which the tie bolt 14 passes. This bolt also passes through the springs 12, the head of the bolt engaging the outer end of one spring and the nut and washer 15 engaging the outer end of the other spring. The compression of the springs may be adjusted by turning the nut 15.

In order that the ring may be expanded to unclamp the turret on the saddle, we have provided a lever 16 keyed to a shaft 17 rotatably supported in the turret support 2 at 18 and 19. The outer end of the shaft terminates in a spreader member 20 having an enlarged opening 21 through which the tie bolt loosely passes. It will be noted in Figure 4 that when the lever 16 is in the position shown, the member 20 will assume a position normal to the axis of the bolt 14, allowing the compression forces of the springs 12 to contract the ring and thus clamp the turret, but when the lever 16 is moved to a position indicated in Figure 5, the member 20 will be swung to the position shown, and its rounded bearing edges 22 will ride upon the bearing plates 23 on the lugs to expand the ring and unclamp the turret.

The lower end of the lever 16 carries a roller 24 for rolling engagement along a surface of the slide bar 25 and the notch 26 formed therein. The lever is normally urged toward the bar and into the depression of the notch 26 by the compression of the springs 12 acting to contract the ring 3 and to return the member 20 to a position normal to the axis of the tie bolt 14 as shown in Figure 4.

The bar 25 is slidable longitudinally and is supported at its ends in the saddle or support 2 as shown more clearly in Figure 16. One end of the bar 25 is recessed at 27 to receive one end of a compression spring 28 carried in and projecting axially from a seat 29 in a bracket on the saddle 2. This end of the bar is slidable in the opening 30 in the saddle 2, and the spring 28 normally urges the bar to the right in Figure 16, but its compression is readily overcome by hydraulic means during the turret unlocking, power indexing and turret locating and locking operations.

The opposite end of the slide bar 25 is formed with a plunger or piston as at 31 and is slidable in the cylinder or chamber 32, there being an abutment 33 on the free end of the piston to limit the movement thereof to the right in Figure 16 and to maintain the port 34 in direct communication with the end wall of the piston either to admit fluid under pressure into the cylinder or to exhaust the same therefrom depending upon the rotative position of the control valve 35. The construction and operation of the type of control valve illustrated in the drawings will be described more fully hereinafter.

From the foregoing it will readily be seen that movement of the slide bar 25 to the left in Figure 16 will cause the roller 24 to travel up the inclined surface 36 of the notch or depression 26 to swing the lever 16 upwardly as shown more clearly in Figure 5. As a result of this movement, the spreader 20 will be shifted so that its diametrically opposed corners 22 will engage the bearing plates 23 carried by the ring ends to thus force the ends apart against the compression of the springs 12 and expand the ring to unclamp the turret.

Movement of the slide bar 25 to the right from the position just described will allow the roller to roll down the inclined wall 36 of the notch and thus return the lever 16 to the position shown in Figure 4, relieving the spreading action on the ring ends and the compression of the springs 12 to contract the ring to clamp the turret on its support.

We have also provided means associated with the slide bar 25 by which the position of the turret may be accurately located when indexing and when so located the turret may be locked in the indexed position until such time as the turret is to be indexed or moved to another operative position.

One side of the slide bar 25 is recessed longitudinally as at 37 to carry a tumbler 38 pivoted at 39 to the bar near the upper side of the bar. The tumbler is provided with an inclined surface 40 and a land or platform portion 41 along which the roller 42 travels when the bar is moved to the left in Figure 7. In this figure the tumbler is prevented from moving in a counterclockwise direction due to the wall 43 of the recess in the bar.

Figure 7:
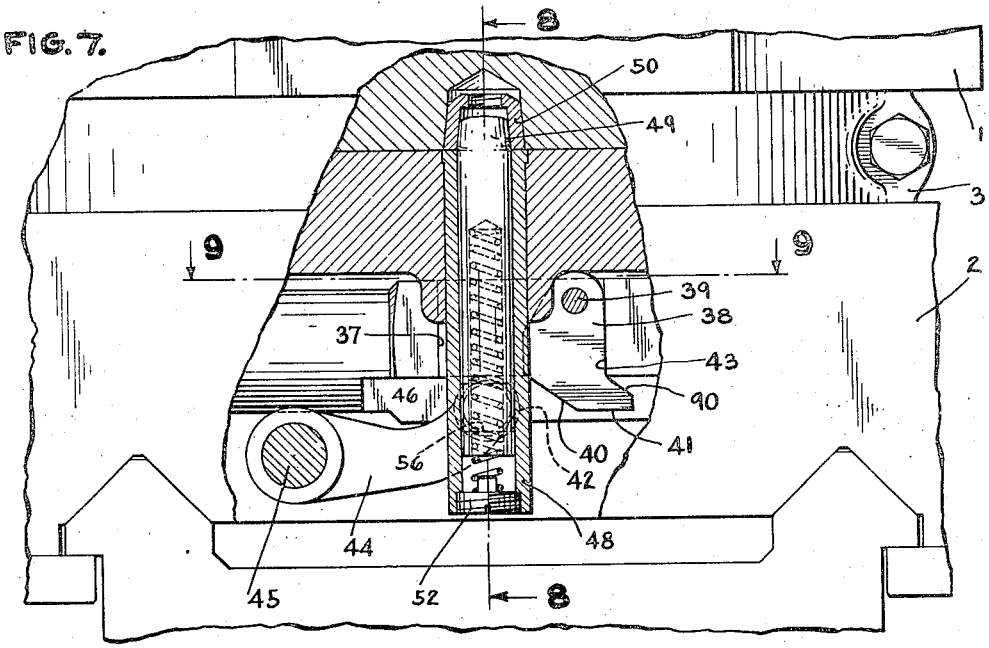
Figure 7 is an enlarged end elevation of the turret and its support and is broken away to show some of the mechanism for locating the turret during an indexing operation and for locking the same in its located position.

The roller 42 is carried on the end of an arm or lever 44 pivotally supported at 45 in the saddle 2 and as the slide bar 25 moves to the left in Figure 7 the roller 42 will engage the inclined surface 40 of the tumbler and ride upon the same forcing the arm or lever 44 to move in a downward direction. Further movement of the bar 25 to the left will permit the roller to ride over upon the land or platform 41 of the tumbler.

In order to provide clearance for the roller in its movement along and beyond the tumbler surfaces, the bar is also recessed as at 46 upwardly along its under side.

We have provided a lock bolt 47 slidably supported in a sleeve 48 carried in the saddle 2. The upper end of the lock bolt may be slightly tapered as at 49 to facilitate its entry into one of the locating bushings 50 carried in the base of the rotating turret head 1 at points corresponding to each face of the turret. The sleeve 48 is slotted at 51 and is provided with a spring retaining nut 52. A compression spring 53 is housed within the hollow lock bolt 47 and normally tends to thrust the lock bolt upwardly toward the turret head and into one of the locating bushings when the latter is in alignment with the axis of the lock bolt.

Figure 8:
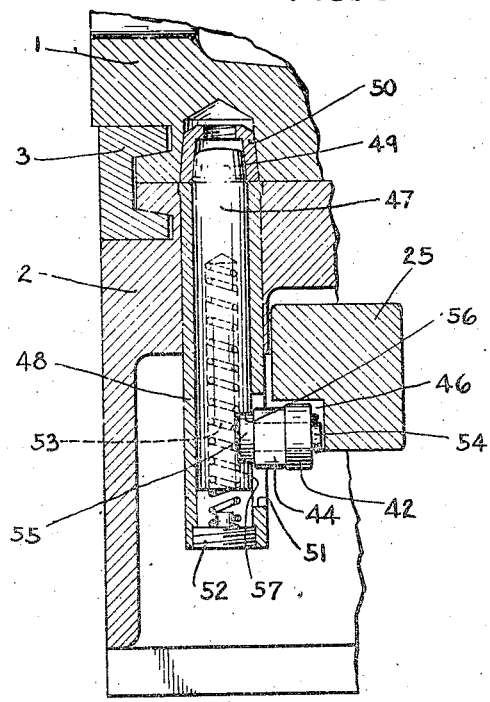
Figure 8 is a section taken on line 8—8 of Figure 7.
Figure 9:
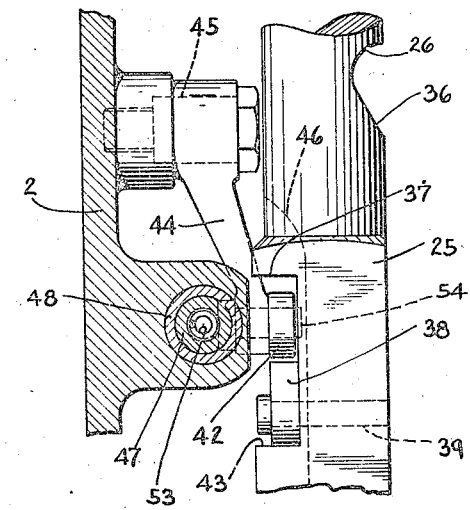
Figure 9 is a sectional view partly in elevation taken on line 9—9 of Figure 7.
Figure 10:
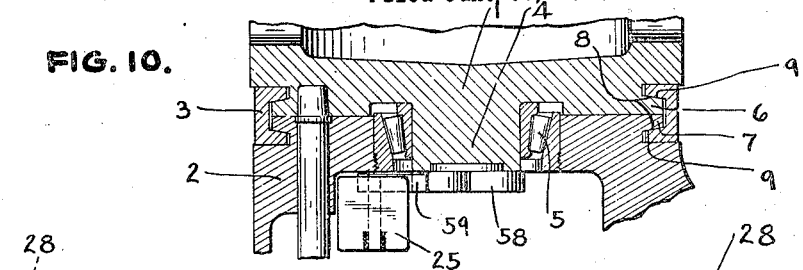
Figure 10 is a sectional view taken on line 10—10 of Figure 3.
Figure 11:
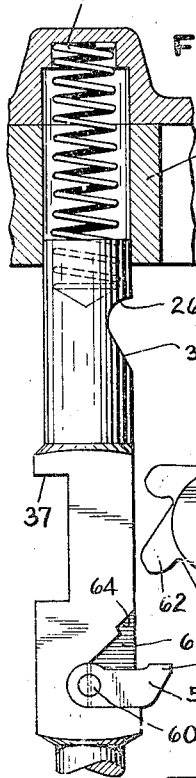
Figures 11, 12, 13 and 14 are elevations of the sliding bar shown in its several respective positions.
Figure 12:
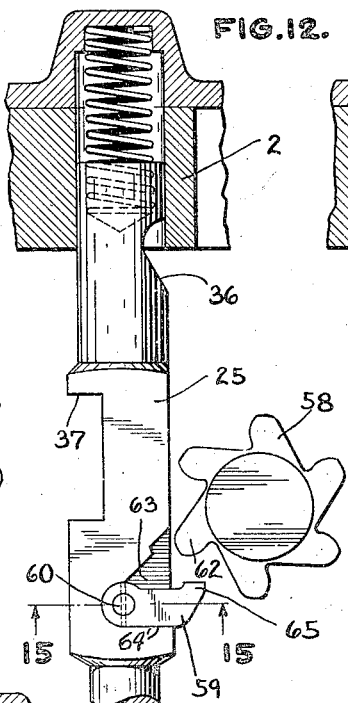

A stud 54 carried by the arm 44 rotatably supports the roller 42 on one end and is headed at 55 on its opposite end. As will be seen in Figures 8 and 9 the headed end of the stud seats in a transverse slot 56 in the side wall of the lock bolt as at 57 so that movement of the lever 44 in either direction will be translated into a movement of the lock bolt.

From the foregoing it will be seen that as the control valve 35 is rotated from "clamp" position to "release" position the slide bar 25 will move to the left in Figures 7 and 16 causing the roller 42 to ride up the inclined surface 40 and onto the platform or land 41 where it will remain. In this manner, the arm 44 will move in a direction away from the bar 25 to retract the lock bolt 47, from the locating bushing 50 with which it was engaged. While the lock bolt is retracted and the roller 42 is on the surface 41, the turret may be rotated manually in either direction to the desired turret face or station, or it may be power indexed as will be described more fully hereinafter.

When the control valve is rotated from the "release" position to "power index" position the slide bar 25 is moved further to the left in Figures 7 and 16. Such movement causes the roller 42 to roll past the platform or land 41 and toward the bar 25 into the recess 46 due to the compression of the spring 53 in the lock bolt. As the turret indexes the upper end of the lock bolt presses against the under surface of the turret until another locating bushing comes into alignment with the lock bolt. The spring 53 then projects the lock bolt into the bushing thereby locating and locking the turret against rotation and in the desired station.

We have provided means associated with the slide bar and with the turret whereby the turret may be automatically power indexed while the control valve is in the above described position, that is, "power indexing" position.

Figure 13:
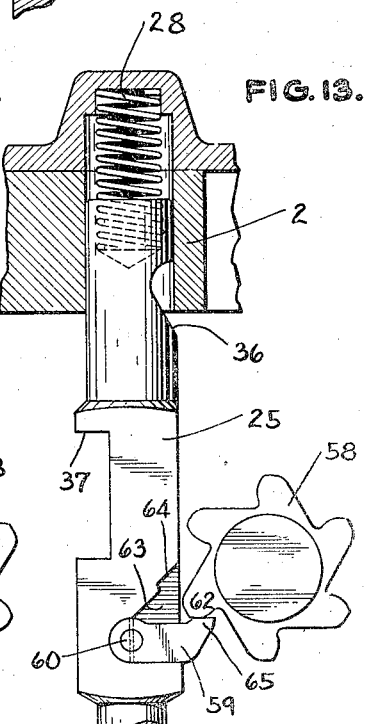
Figure 14:
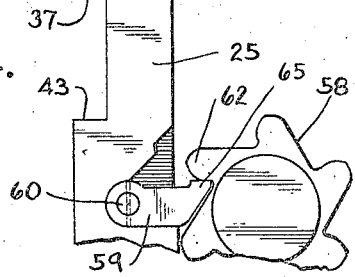
Figure 15:
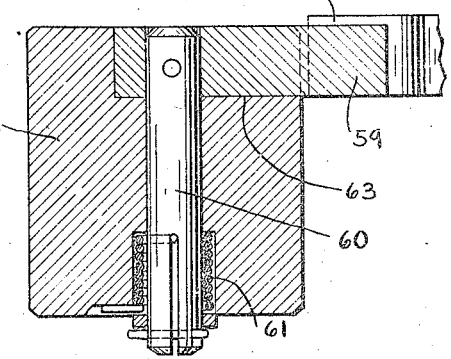
Figure 15 is a section taken on line 15—15 of Figure 12.

Referring now more particularly to Figures 10 to 16 inclusive, we have illustrated one form of power indexing means which includes a ratchet wheel 58 carried by the turret projection 4. The slide bar 25 carries a ratchet operating finger 59 pivotally attached to the bar at 60, and adapted normally to be projected outwardly of the bar by the spring 61, as shown, to engage one of the teeth 62 of the ratchet wheel, as the bar 25 is slid forward to index the turret. The bar 25 is recessed at 63 to permit the ratchet finger to lie within the top surface of the bar and to provide a clearance 64 for the finger as the latter is retracted into the bar by one of the teeth 62 upon the return movement of the bar after indexing, and to provide a stop 64' to limit clockwise rotation of the finger. During the indexing portion of the bar movement as shown in Figure 13, the finger moves in a path so that its tip portion 65 engages a tooth 62 of the ratchet wheel.

Continued movement of the bar to the left in Figure 16 or upwardly in Figure 13 will cause the ratchet wheel and the turret to be rotated sufficiently to bring the next station or face of the turret into position with respect to the work. This is clearly illustrated in Figure 14 which shows the relative positions of the bar 25 and the tooth 62 at the end of the indexing motion. Then the operator rotates the control valve from "power index" position to "clamp" position, thus returning the bar 25 to the position shown in Figures 4, 11 and 16.

During the return of the bar, the roller now operating in the clearance recess 46 will engage the tumbler at its right hand end in Figure 7 and continued return motion of the bar will swing the tumbler in a clockwise direction in the recess 37, permitting the roller to travel in the channel or recess 46 throughout the entire return movement of the bar. As the roller clears the tumbler, the latter will return to a substantially vertical position by the force of gravity. Since the arm or lever 44 is not swung on its fulcrum 45 during this return movement the turret will remain locked, that is, the lock bolt 47 will remain in locking engagement with the locating bushing into which it had just previously been projected.

As the bar continues further on its return movement to the extreme left in Figure 16, the roller 24 will ride off the upper surface of the bar and down the inclined wall 36 and into the notch or recess 26. In this manner the clamping ring 3 is allowed to contract and firmly grip the flanges 8 of the turret and its support to thereby positively clamp the turret on the saddle 2.

In Figures 16 to 19 inclusive we have illustrated a single control means for selectively effecting the clamping and unclamping of the turret to the saddle, locating, locking and unlocking the turret, and for indexing the turret either manually or by power.

While power operation may be accomplished electrically, magnetically, mechanically or hydraulically, we have illustrated the use of the latter, but it is to be understood that the invention contemplates the use of any suitable arrangement of power distribution, as indicated above.

In the present illustration, we have shown a single, conveniently located control valve of the rotative type indicated at 35. The valve body operates in a casing 70 and is provided with a stem 71 projecting through the casing and carrying a control or operating handle 72. A pointer 73 operates with the handle and valve stem and moves over an indicator plate or face 74 on the outer wall of the casing, as illustrated in Figure 19. The indicator face is provided with indicia of any desired style to indicate the respective valve positions for the several operations to be performed. In the present illustration the indicia consist of the following: "Clamp," "release," and "power index," denoting, as the terms imply, the three principal operations to be performed, that is, "clamp" position denotes the step in the cycle of operation in which the turret is clamped on the saddle; "release," in which the turret is unclamped on the saddle and the locking bolt is retracted from engagement with one of the locating bushings; and "power index," in which the turret is power indexed to the next station or face and then located and locked. When the pointer indicates "release" position, the turret may be indexed manually by spinning the same in either direction to any station or face desired.

Fluid under pressure is fed from a suitable source (not shown) through a pipe 75 and the ducts 76 and 77 to an annular groove 78 in the valve body 35.

When the valve is in the "clamp" position, as shown in Figure 16, fluid under pressure will not be admitted from the valve to the cylinder or chamber 32, but the ports 79 and 34 leading from the cylinder to the valve will open the cylinder to exhaust through the grooves 81 and 82, the ducts 83, 84, 85 to the exhaust conduit 86. Since the spring 28 normally urges the bar to the right in Figure 16, and the cylinder 32 is open to exhaust, the bar will assume the position shown, to clamp the turret on the saddle.

When the control valve is rotated to "release" position, as illustrated in Figure 17, fluid under pressure will be admitted from the intake duct 77 and around the annular groove 78 and thence longitudinally of the valve through the duct 87a which communicates fluid through the port 34 to the cylinder or chamber 32, forcing the slide bar to the left until its piston end 31 uncovers the port 79. When the port 79 is open to the cylinder, any further fluid entering the cylinder will be exhausted through the port 79, the longitudinal duct 88, the ducts 82, 83, 84 and 85 and the pipe 86. Motion of the bar to the left is thus arrested at this point, but during the movement of the bar thus far the roller 24 will have traveled up the inclined wall 36 and the lever will have been swung to the position shown in Figure 5 to release the clamping band 3 by expanding it circumferentially.

Simultaneously the lock bolt 47 will have been withdrawn from its locating bushing in the turret base as a result of the roller 42 riding up the inclined wall 40 of the tumbler 38 and onto the platform or land portion 41.

As has been explained before, under these conditions the lever or arm 44 will be depressed to withdraw the locking bolt from the bushing 50 against the compression of the spring 53. The turret may now be spun freely to any station or face in either direction, since the teeth 62 of the ratchet wheel are free of engagement with the finger 59 (see Figure 12).

When the control valve is rotated to the "power index" position as illustrated in Figure 18, fluid under pressure will be delivered through the ducts 77, 78 and 87b and the port 34 to the cylinder 32, but fluid exhaust through port 79 will have been cut off, since the duct 88 is now rotated past the exhaust port 79 as indicated in the figure. When the valve is in this position, fluid under pressure will force the slide bar to its extreme left position against the full compression of the spring 28. During such motion of the bar, the roller 42 will pass over and off the platform 41 into the clearance recess 46 thus permitting the lever or arm 44 to swing upwardly and the lock bolt 47 to engage the under surface of the turret under the action of the spring 53. It is to be noted that the roller 42 will not pass over the end of the platform surface 41 until the beginning of the indexing movement of the turret or at least a sufficient rotation of the turret to break the alignment of the locating bushing with the locking bolt. As the bar continues its travel to the left in Figure 16 with the finger 59 in engagement with one of the ratchet teeth 62 the ratchet wheel and turret to which it is fixed will be indexed one station or face. When the turret has been indexed in this manner the next locating bushing will have been brought into substantial axial alignment with the locking bolt 47 and the latter will enter the bushing under the action of the spring 53 to locate and lock the turret in its indexed position.

The control valve is then turned again to "clamp" position, which, as illustrated in Figure 16, opens the ports 79 and 34 to exhaust and permits the full compression of the spring 28 to return the slide bar 25 to its extreme right hand position with the stop 33 abutting the end wall of the cylinder 32. As the slide bar returns to this position the roller 24 rides down the inclined wall 36 of the bar and lever 16 will return to the position shown in Figure 4 to permit the ring 3 to contract and clamp the turret on the saddle.

Simultaneously with the return of the bar 25 the roller 42 will travel along the clearance recess 46 and engage the under-surface 90 of the tumbler 38, swinging the tumbler in a clockwise direction on its pivot 39 until the roller is clear of the tumbler. The tumbler will then return to the position shown in Figure 7 by force of gravity.

The cycle of operation of the mechanism is thus complete and may be repeated as desired.

It will be seen from the foregoing that our invention is quite simple in construction and positive in operation, and that the turret may be indexed manually to any station or face in either direction, as well as power indexed by operation of the control valve. The provision of a single control means, or valve as illustrated herein, greatly simplifies the operation of the mechanism and insures convenient and positive control of the mechanism throughout its complete cycle of operation.

Furthermore, by providing a single operating member such as the slide bar 25, the associated clamping means, locating and locking means and the power indexing means may be actuated in quick succession by a single control means.

Various changes may be made in the details of construction and arrangement of parts without departing from the spirit of the invention or scope of the appended claims.

We claim:

1. In a machine tool, a member to be indexed, locked, and clamped, means for indexing said member, means for locking and means for clamping and unclamping said member, an actuator for actuating each of said means, an hydraulic motor for moving said actuator in one direction to unclamp and unlock and then index said member, means for returning said actuator to lock and clamp said indexed member, a source of fluid pressure, and a single control valve for said hydraulic motor, said valve and said motor having a plurality of cooperating fluid distributing ports, said valve being movable to select one of a plurality of stations for said actuator whereby to unclamp and unlock and/or index said member.

2. In a machine tool, a member to be indexed, means for indexing said member, means for clamping said member, means for locking member, an actuator for actuating said several means, an hydraulic motor for moving said actuator in one direction to unclamp and unlock and then to index said member, and means normally urging said actuator in an opposite direction to lock and clamp said member after said member has been indexed, a cylinder in said motor, said actuator comprising a bar, a piston in said cylinder and formed on one end of said actuator bar, an indexing pawl on said bar engageable with the member to be indexed, a cam surface on said bar engageable by said clamping means, said bar having an intermediate recessed portion, a pivoted member of said recess, said pivoted member being engageable by said locking means and having an inclined surface for guiding and actuating said locking means upon movement of the actuator in one direction, said pivoted member having rotative engagement with said locking means when said actuator is moved in the opposite direction, and a control valve for said motor operable through a plurality of stations whereby said bar may be advanced to first actuate said clamping and locking means and finally to actuate said indexing means.

OSKAR KYLIN.
HENRIK O. KYLIN.
MICHAEL L. VALENTINO.

REFERENCES CITED

The following references are of record in the file of this patent:

UNITED STATES PATENTS

| Number | Name | Date |
| --- | --- | --- |
| 1,953,876 | Burrell | Apr. 3, 1934 |
| 1,745,460 | Sudhoff | Feb. 4, 1930 |
| 938,156 | Libby | Oct. 26, 1909 |
| 1,934,358 | Kylin | Nov. 7, 1933 |
| 2,148,779 | Senger | Feb. 28, 1939 |
| 2,289,957 | Godfriaux | July 14, 1942 |
| 2,094,993 | Lovely et al. | Oct. 5, 1937 |
| 1,942,927 | Johnson et al. | Jan. 9, 1934 |
| 1,046,529 | Winton | Dec. 10, 1912 |